US012698743B2

(12) United States Patent
Wong et al.

(10) Patent No.: US 12,698,743 B2
(45) Date of Patent: *Aug. 4, 2026

(54) FUEL SYSTEMS AND METHODS FOR PURGING

(71) Applicant: PRATT & WHITNEY CANADA CORP., Longueuil (CA)

(72) Inventors: Owen Ho-Yin Wong, Markham (CA); John Galas, Mississauga (CA); Sean Durand, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/327,031

(22) Filed: Sep. 12, 2025

(65) Prior Publication Data

US 2026/0015979 A1 Jan. 15, 2026

Related U.S. Application Data

(62) Division of application No. 17/228,522, filed on Apr. 12, 2021, now Pat. No. 11,808,219.

(51) Int. Cl.
| | |
|---|---|
| *F02C 9/40* | (2006.01) |
| *F02C 3/22* | (2006.01) |
| *F02C 3/24* | (2006.01) |
| *F23K 5/18* | (2006.01) |
| *F23R 3/36* | (2006.01) |
| *F02C 7/22* | (2006.01) |
| *F02C 7/232* | (2006.01) |

(52) U.S. Cl.
CPC .................. *F02C 9/40* (2013.01); *F02C 3/22* (2013.01); *F02C 3/24* (2013.01); *F23K 5/18* (2013.01); *F23R 3/36* (2013.01); *F02C 7/222* (2013.01); *F02C 7/232* (2013.01); *F05D 2260/602* (2013.01); *F23D 2209/30* (2013.01)

(58) Field of Classification Search
CPC ......... F23D 2209/30; F23D 5/18; F02C 7/232
See application file for complete search history.

(56) References Cited

U.S. PATENT DOCUMENTS

| | | | |
|---|---|---|---|
| 5,059,114 A | 10/1991 | Stout | |
| 6,145,294 A | 11/2000 | Traver et al. | |
| 6,438,963 B1 | 8/2002 | Traver et al. | |
| 7,721,521 B2 | 5/2010 | Kunkle et al. | |

(Continued)

OTHER PUBLICATIONS

European Patent Office, Communication re: extended European search report for EP Patent Application No. 22168028.3, dated Mar. 2, 2023.

*Primary Examiner* — Lorne E Meade
*Assistant Examiner* — Alyson Joan Harrington
(74) *Attorney, Agent, or Firm* — Norton Rose Fulbright Canada LLP

(57) ABSTRACT

A fuel system can include a first fuel circuit, a second fuel circuit, and an inert gas purge system operatively connected to both the first fuel circuit and the second fuel circuit to purge at least a portion of either or both of the first and/or second fuel circuit. The first fuel can be a liquid fuel and the second fuel can be a gaseous fuel. The first fuel circuit can include a first fuel manifold configured to fluidly communicate a first fuel supply with at least one dual fuel nozzles downstream of the first fuel manifold.

7 Claims, 2 Drawing Sheets

(56)                    References Cited

U.S. PATENT DOCUMENTS

| | | | |
|---|---|---|---|
| 8,261,529 B2 | 9/2012 | Koizumi et al. | |
| 8,365,536 B2 | 2/2013 | Khan et al. | |
| 9,121,352 B2 | 9/2015 | Montagne et al. | |
| 9,447,730 B2 | 9/2016 | Ochiai | |
| 10,378,448 B2 | 8/2019 | Nakahara | |
| 10,473,060 B2 | 11/2019 | Montagne | |
| 2005/0193741 A1 | 9/2005 | Iasillo et al. | |
| 2007/0101723 A1 | 5/2007 | Kunkle | |
| 2008/0098994 A1 | 5/2008 | Innes et al. | |
| 2010/0162711 A1 | 7/2010 | Zuo et al. | |
| 2012/0192542 A1 | 8/2012 | Chillar et al. | |
| 2012/0232768 A1 | 9/2012 | Nenmeni et al. | |
| 2013/0118178 A1 | 5/2013 | Sabelhaus et al. | |
| 2013/0186057 A1 | 7/2013 | Shanmugam et al. | |
| 2015/0300260 A1* | 10/2015 | Wollenweber | F02C 9/40 |
| | | | 60/39.12 |
| 2015/0337730 A1 | 11/2015 | Kupiszewski et al. | |
| 2015/0344145 A1 | 12/2015 | Epstein | |
| 2016/0076461 A1 | 3/2016 | Kawai | |
| 2017/0254270 A1 | 9/2017 | Okada et al. | |
| 2018/0187609 A1 | 7/2018 | Schell | |
| 2018/0238548 A1 | 8/2018 | Buelow et al. | |
| 2022/0205393 A1* | 6/2022 | Brightwell | F02C 7/22 |

* cited by examiner

FUEL SYSTEMS AND METHODS FOR PURGING

CROSS-REFERENCE TO RELATED APPLICATION(S)

This application is a division of U.S. patent application Ser. No. 18/374,072 filed on Sep. 28, 2023 and incorporated herein by reference, which is a division of U.S. patent application Ser. No. 17/228,522 filed on Apr. 12, 2021, issued as U.S. Pat. No. 11,808,219 and incorporated herein by reference.

TECHNICAL FIELD

The present disclosure relates to aircraft fuel systems, and more particularly to systems and methods for purging a dual-fuel system of an aircraft.

BACKGROUND

There is always a need for improvements to fuel systems in the aerospace industry.

SUMMARY

In certain embodiments of the present disclosure, a fuel system includes a combustor, a liquid fuel circuit selectively fluidly connected to the combustor via a liquid fuel manifold, a gaseous fuel circuit selectively fluidly connected to the combustor via a gaseous fuel manifold, and a gas source selectively fluidly connected to the gaseous fuel manifold. In embodiments, the gas source includes an inert gas. The gaseous fuel manifold fluidly communicates a gaseous fuel supply with at least one dual fuel nozzle downstream of the gaseous fuel manifold.

In embodiments, the fuel system further includes a purge gas circuit in fluid communication with the gas source and the gaseous fuel manifold such that the gaseous fuel circuit and the purge gas circuit share a common outlet of the gaseous fuel manifold. In embodiments, the liquid fuel circuit fluidly communicates a liquid fuel supply with the at least one dual fuel nozzle downstream of the liquid fuel supply. In certain such embodiments, the purge gas circuit is in fluid communication with the liquid fuel manifold such that the liquid fuel circuit and the purge gas circuit share a common outlet of the liquid fuel manifold.

In embodiments, the purge gas circuit further includes at least one three-way valve configured to issue purge gas to either the gaseous fuel manifold or the liquid fluid manifold, or to issue purge gas to the gaseous fuel manifold and the liquid fuel manifold simultaneously. In certain embodiments, the fuel system further includes a controller operatively connected to the purge gas circuit configured to control flow of purge gas through the purge gas circuit. In certain such embodiments, the controller is configured to issue purge gas through the purge gas circuit to either the gaseous and/or liquid fuel manifolds.

In embodiments, there is provided a non-transitory computer readable medium comprising computer executable instructions, the instructions configured to cause a computer to perform a method. In certain embodiments, the method includes controlling a purge gas valve of a dual fuel system of an aircraft and a gaseous fuel valve of the dual fuel system to cause purging of a gaseous fuel circuit feeding a fuel to a dual fuel engine of the aircraft, the purging being performed with a gas from a gas supply of the aircraft. In embodiments, the method further includes, preventing flashback from a combustor of the engine. In certain such embodiments, the method is performed during starting up and/or shutting down the engine in gas operation, and the purge gas includes an inert gas.

In embodiments, controlling the purge gas valve and the gaseous fuel valve includes closing a gaseous fuel shut off valve to shut off gaseous fuel flow at least in part concurrently with opening the purge gas valve in a manner that maintains a higher pressure in the gaseous fuel circuit than in the combustor and thereby shutting down the engine. In certain embodiments, controlling the purge gas valve and gaseous fuel valve includes progressively opening the purge gas valve and/or progressively closing the gaseous fuel valve while maintaining pressure in the gaseous fuel circuit greater than the combustor in order to progressively increase a mixture of inert gas with the gaseous fuel until flameout, and then closing the purge gas valve and gaseous fuel valve after flameout.

In embodiments, a method can include purging a gaseous fuel circuit of a dual fuel engine of an aircraft fuel system with an inert gas purge system during startup and/or shutdown to prevent flashback. In certain embodiments, the method can further include reducing a gaseous fuel pressure to a predetermined threshold pressure at or greater than a combustor pressure, before purging. In certain embodiments, the method can include shutting off a gaseous fuel flow before purging. In certain embodiments, purging includes issuing purge gas while issuing gaseous fuel to a fuel nozzle such that issuing purge gas includes mixing the purge gas with a gaseous fuel within a respective manifold.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the systems and methods of the subject disclosure without undue experimentation, embodiments thereof will be described in detail herein below with reference to certain figures, wherein.

DETAILED DESCRIPTION

Figure 1:
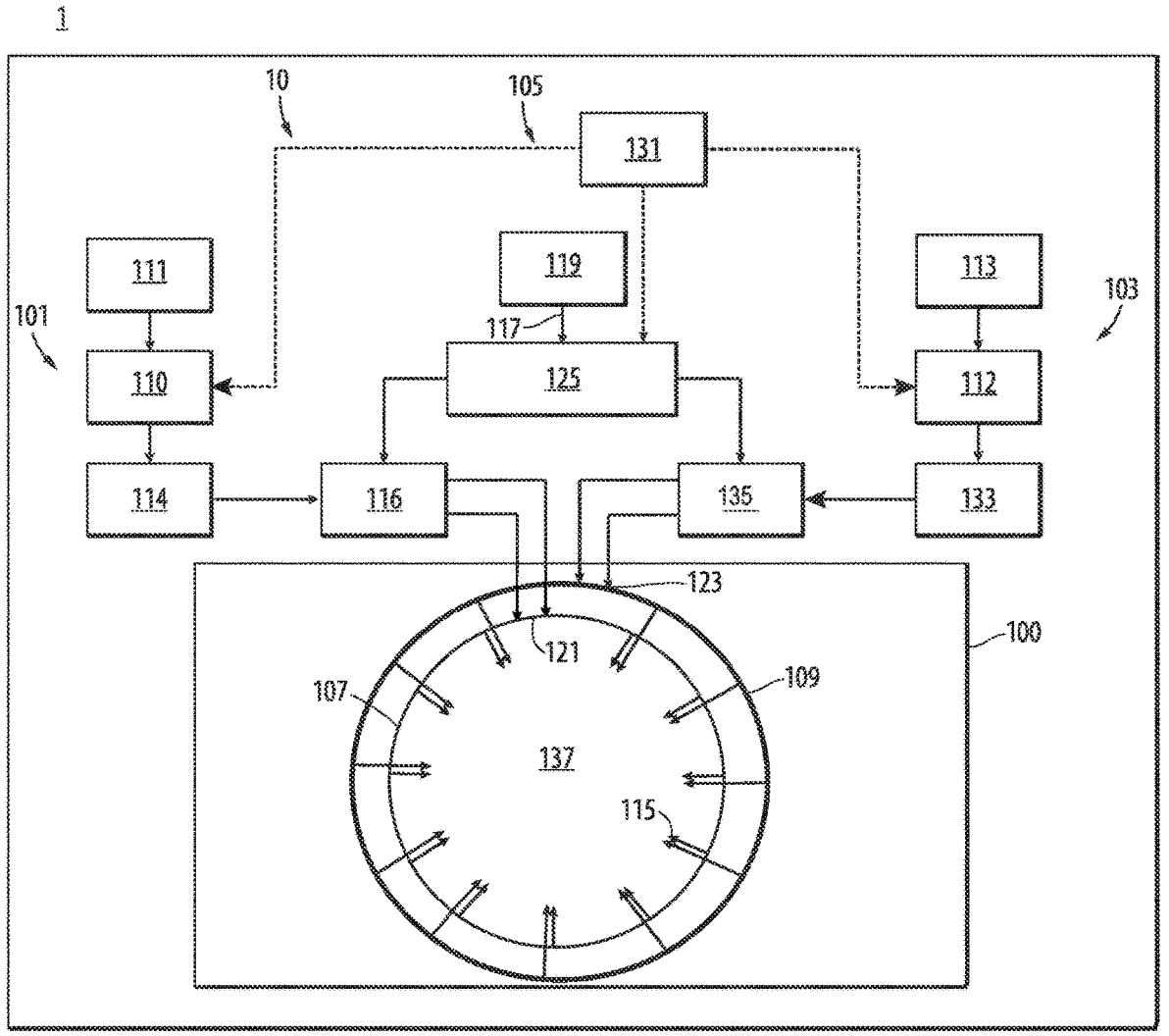
FIG. 1 is a schematic view of an embodiment of an aircraft dual-fuel fuel system constructed in accordance with the present disclosure, showing a purge process of the dual-fuel fuel system.
Figure 2:
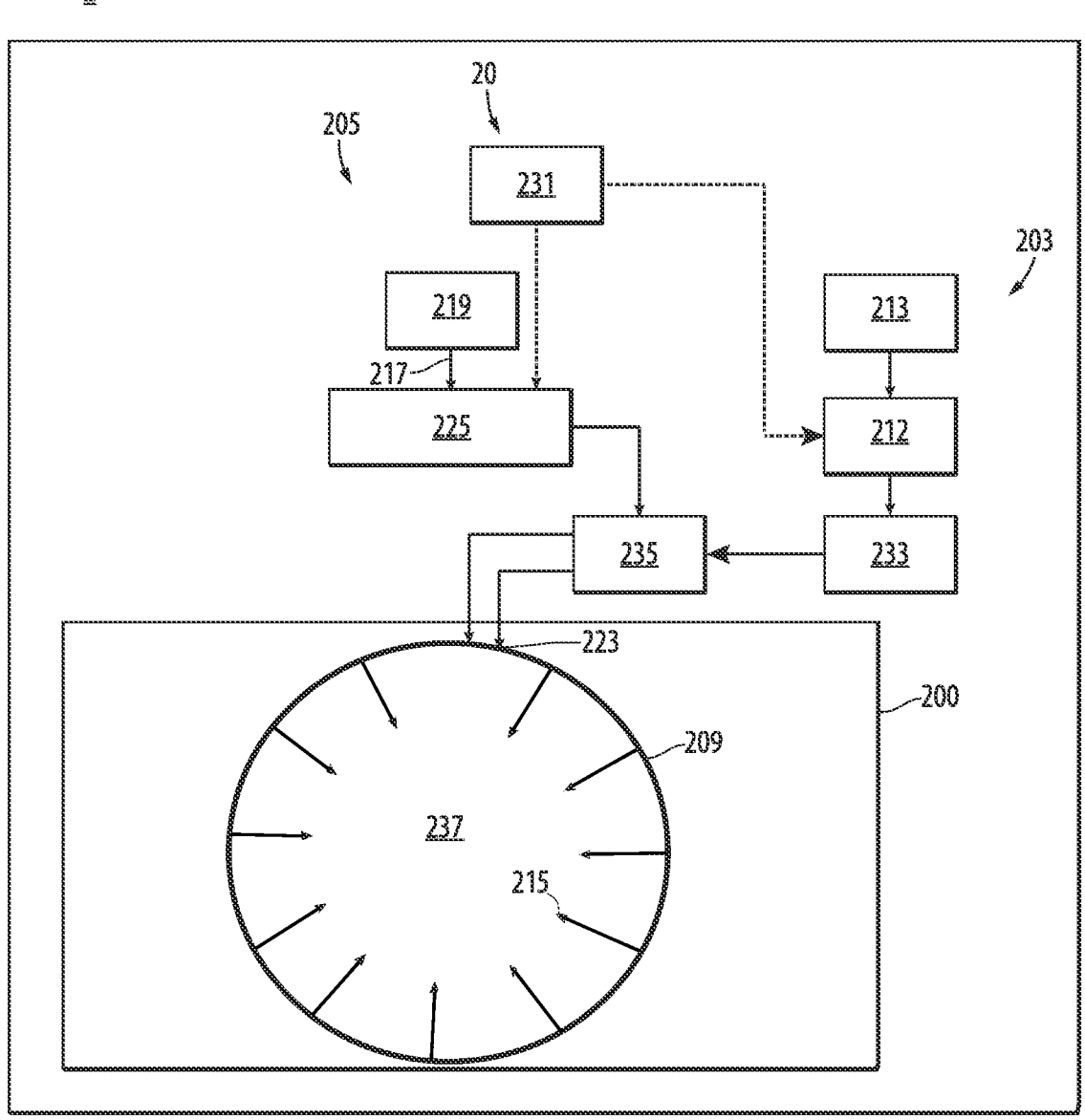
FIG. 2 is a schematic view of an embodiment of an aircraft fuel system constructed in accordance with the present disclosure, showing a purge process of a single-fuel fuel system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments and/or aspects of this disclosure are shown in FIG. 2. Certain embodiments described herein can be used to prevent flashback and coking in manifolds of a dual-fuel engine.

Referring to FIG. 1, an aircraft 1 includes a fuel system 10 having a combustor 100, a liquid fuel circuit 101, a gaseous fuel circuit 103, and a gas purge system 105 selectively fluidly connected to both the liquid fuel circuit 101 and the gaseous fuel circuit 103 to purge at least a portion of either or both of the liquid and/or gaseous fuel circuits 101, 103. The liquid fuel circuit 101 includes a liquid fuel manifold 107 and the gaseous fuel circuit 103 includes a gaseous fuel manifold 109. Each fuel manifold 107, 109 fluidly communicates a respective fuel supply 111, 113 with at least one dual-fuel nozzle 115 downstream of the respective fuel supplies 111, 113, for feeding fuel to a dual-fuel engine, for example. In embodiments, the fuel circuits 101, 103 can include any other suitable additional components and/or features, for example a respective fuel metering unit 110, 112, a flow meter 114, and a flow divider and valve assembly 116, in any suitable position in the fuel circuits 101, 103 (e.g. as shown). In certain embodiments, at least part of fuel system 10 can be located in a wing of the aircraft 1.

The purge system 10 includes a purge gas circuit 117, having a purge gas supply 119 in selective fluid communication with the liquid and/or gaseous fuel manifold 107, 109 such that the liquid fuel circuit 101 and the purge gas circuit 117 share a common outlet 121, e.g., an opening to the liquid fuel manifold 107. As shown, the purge gas circuit 117 is also in selective fluid communication with the gaseous fuel manifold 109 such that the gaseous fuel circuit 103 and the purge gas circuit 117 share a common outlet 123, e.g., an opening to the gaseous fuel manifold 107.

The purge gas can include a purely inert gas, such nitrogen, helium, argon. In embodiments, the purge gas can be a non-inert gas, or a mixture of inert and non-inert gases that does not that does not undergo unwanted chemical reactions with surrounding hardware and fluids. For example, the purge gas can include any suitable combination of inert gas and compressor air, or gas otherwise sourced along the gas path of the engine during operation (e.g. where pressure is sufficient to refill the purge gas supply 119). Any other suitable purge gas or liquid is contemplated herein.

The purge gas supply 119 can include a suitable tank, placed within the aircraft 1, and purge gas can be supplied to the purge gas circuit 117 in any suitable manner. The purge gas system 105 can include one or more components made of any suitable material (e.g., stainless steel such as 300 SST tubing and fittings).

In certain embodiments, the purge system 105 includes at least one three-way valve 125 configured to issue purge gas to the liquid fuel manifold 107 and the gaseous fuel manifold 109 simultaneously. In the liquid fuel circuit 101, the liquid fuel flow and purge gas flow meet at the flow divider and valve assembly 116, downstream of the purge gas supply 119, at an inlet of the liquid fuel manifold 107. In the gaseous fuel circuit 103, the gaseous fuel flow and the purge gas flow meet at a gaseous fuel shut off valve 135, downstream of the purge gas supply 119, at an inlet of the gaseous fuel manifold 109.

In certain embodiments, the system 10 includes a controller 131 that configured to control flow of purge gas through the purge gas circuit 105. The controller 131 includes any suitable hardware and/or software module(s) configured to perform any suitable function disclosed herein or otherwise. For example, the controller 131 is configured to issue purge gas through the purge gas circuit 117 to either or both of the liquid and/or gaseous fuel manifolds 107, 109, e.g., as described above. For example, as shown, the controller 131 is operatively connected to the valve 125 and configured to control a position of the valve 125 to issue purge gas from the supply 119 to either or both of manifolds

107, 109 (or any suitable components, e.g., 116, 135, upstream of the manifolds 107, 109) in one or more suitable conditions.

In certain embodiments, the controller 131 is configured to control a fuel flow of either or both of the liquid fuel and the gaseous fuel. In this regard, the controller 131 is configured to manage fuel flow and purge gas flow during start up and/or shutdown to perform any suitable start up and/or shutdown purge method, e.g., as disclosed herein. The system 10 can include any other suitable components or arrangement of components as appreciated by those having ordinary skill in the art in view of this disclosure.

In accordance with at least one aspect of this disclosure, a non-transitory computer readable medium can have computer executable instructions, the instructions being configured to cause a computer to perform any suitable method disclosed herein. For example, certain embodiments of a method include controlling a purge gas valve, e.g., valve 125, and at least one gaseous fuel valve, e.g., valve 133 and/or valve 135 to cause purging of the gaseous fuel circuit 103. Controlling the purge gas valve 125 and gaseous fuel valve includes closing at least gaseous fuel shut off valve 133 to shut off gaseous fuel flow at the same time that the purge gas valve 125 is opened in a manner that maintains a higher pressure in the gaseous fuel circuit 103 than in the combustor 100 in order to shut down the engine and prevent flashback. In certain embodiments, controlling the purge gas valve and gaseous fuel valve includes progressively opening the purge gas valve 125 and/or progressively closing the gaseous fuel valve, e.g., 133 and/or 135, while maintaining a pressure in the gaseous fuel circuit 103 greater than the combustor 100 in order to progressively increase a mixture of inert gas with the gaseous fuel until flameout. After flameout, the purge gas valve 125 and gaseous fuel valve, e.g., 133 and/or 135 are closed.

In accordance with at least one aspect of this disclosure, a method can include purging the gaseous fuel circuit 103 (e.g., a hydrogen fuel circuit) of an aircraft dual-fuel fuel system e.g., system 10 with an inert gas purge system e.g., system 105, during startup and/or shutdown to prevent flashback. However, it is contemplated that such a method may be suitable in instances other than startup or shutdown, for example, in the event of a fire, in the event of a runaway engine condition, or in the event of other emergency requiring the purge sequence to cause flame out. Any suitable purge method is contemplated herein.

In certain embodiments, the method further includes reducing a gaseous fuel pressure to a predetermined threshold pressure at or greater than a combustor pressure, before purging. In certain embodiments, the method includes shutting off a gaseous fuel flow before purging. In certain embodiments, purging includes issuing purge gas while issuing gaseous fuel to a fuel nozzle such that issuing purge gas includes mixing the purge gas with a gaseous fuel within a respective manifold 107, 109.

In certain embodiments, e.g., for startup, a method includes first activating the purge gas supply 119 to a purge control valve 125 (e.g. a solenoid valve). Once the pressure of the purge gas within in the gaseous fuel manifold 109 increases above a predetermined pressure (e.g. ambient pressure) and all air has been forced out of the gaseous fuel manifold 109, and nozzles 115, the purge gas supply 115 is deactivated using purge valve 125 and controller 131. Immediately thereafter, the engine's starting up sequence can begin, including engine rotation, ignition, and initiating high pressure gaseous fuel flow (e.g. from gaseous fuel supply 113) into the second manifold 109, thereby pushing out the purge gas. Introduction of the gaseous fuel into the gaseous fuel manifold 109 pressurized with purge gas performs better than conventional purge systems by preventing the backflow of air into the gaseous fuel manifold 109 through the nozzles 115.

In certain embodiments, e.g. for shutdown, a method includes stabilizing the engine at an idle speed and reducing fuel pressure in the gaseous fuel to a pressure below predetermined pressure threshold (e.g. combustor pressure of about 30-35 psi). Before the pressure of the gaseous fuel drops below the predetermine pressure threshold, the purge gas supply 119 is activated through the purge circuit 117 via the purge control valve 125 and controller 131. At the same time the purge gas supply 119 is activated, the gaseous fuel supply 113 is deactivated via the valves 133 and/or 135. Once flameout in the combustor 100 has been detected, the purge gas supply 119 is deactivated.

In this manner, initiating the flow of the purge gas during the shutdown sequence, and blending it with the gaseous fuel can maintain a pressurized manifold (e.g. gaseous fuel manifold 109) to prevent the flammable gas fuel-air mixture from backflowing into the nozzles 115 and gaseous fuel manifold 109. The purge gas can also dilute the fuel-air mixture to assist in extinguishing the flame. It is also contemplated that the gaseous fuel supply 113 can be deactivated prior to the activation of the purge gas supply 119, however there may be an increased risk of flashback if such shutdown is done in a manner that the pressure in the manifold 109 drops below combustor pressure while the engine is still ignited.

The above engine starting and shutdown purging procedures are described in terms of flushing a gaseous fuel circuit 103 with inert purge gas, however the because the engine is a dual fuel engine, it should be appreciated by those having ordinary skill in the art that the methods described above can also be used in a similar manner when flushing the liquid fuel circuit 101 of the engine, whether independently from, or simultaneously with the gaseous fuel circuit 103. For example when changing between fuel types, the liquid fuel circuit 101 can be purged with purge system 105 such that any remaining liquid fuel in the manifold 107 is forced into the hot combustion chamber 137 of the combustor 100 to be vaporized. Flushing out residual liquid fuel can additionally be used to prevent coking of residual liquid fuel in the dual-fuel nozzles 115 and liquid fuel manifold 107. Additionally, the same, or similar, systems and methods as described herein can also be applied to a gaseous fuel-only aircraft engine, without departing from the scope of this disclosure, e.g., as shown in system 20 of FIG. 2.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art. The methods and systems of the present disclosure, as described above and shown in the drawings provide for improved flashback prevention when starting up and shutting down a dual-fuel engine. For example, conventional dual-fuel engine systems may allow for flashback of the liquid and/or gaseous-fuel during engine startup and/or shutdown if any trace amounts of fuel accumulated within the manifolds 107, 109 during the prior fuel operation, creating a flammable mixture in the manifold(s) 107, 109 and/or allowing flame to creep back into the manifolds. Without flashback prevention measures such as purge system 105, flashback risks can be high, especially with a highly volatile gas fuel such as hydrogen. While the subject disclosure includes reference to certain embodiments, those skilled in the art will readily appreciate that changes and/or modifications may be made thereto without departing from the spirit and scope of the subject disclosure.

What is claimed is:

1. A non-transitory computer readable medium comprising computer executable instructions, the instructions configured to cause a computer to perform a method, the method comprising:

controlling a purge gas valve of a dual-fuel system of an aircraft and a gaseous fuel valve of the dual-fuel system to cause purging of a gaseous fuel circuit feeding a gaseous fuel to a dual-fuel engine of the aircraft, the purging being performed with a gas from a gas supply of the aircraft; and simultaneously purging with the gas during shutdown of the dual-fuel engine of the aircraft both the gaseous fuel circuit and a liquid fuel circuit configured to feed a liquid fuel to the dual-fuel engine of the aircraft.

2. The non-transitory computer readable medium of claim 1, wherein:

the method includes preventing flashback from a combustor of the dual-fuel engine of the aircraft by purging of the gaseous fuel circuit during starting up and/or shutting down the dual-fuel engine of the aircraft in gaseous fuel operation.

3. The non-transitory computer readable medium of claim 1, wherein the gas includes an inert gas.

4. The non-transitory computer readable medium of claim 1, wherein controlling the purge gas valve and the gaseous fuel valve includes closing a gaseous fuel shut off valve to shut off gaseous fuel flow at least in part concurrently with opening the purge gas valve in a manner that maintains a higher pressure in the gaseous fuel circuit than in a combustor of the dual-fuel engine of the aircraft and thereby shutting down the dual-fuel engine of the aircraft.

5. The non-transitory computer readable medium of claim 1, wherein:

the gas is an inert gas; and controlling the purge gas valve and the gaseous fuel valve includes progressively opening the purge gas valve and/or progressively closing the gaseous fuel valve while maintaining pressure in the gaseous fuel circuit greater than in a combustor of the dual-fuel engine of the aircraft in order to progressively increase a mixture of the inert gas with the gaseous fuel until flameout, and then closing the purge gas valve and the gaseous fuel valve after flameout.

6. The non-transitory computer readable medium of claim 1, wherein:

the gas is an inert gas; and the method includes purging the liquid fuel circuit with the inert gas when changing from liquid fuel operation to gaseous fuel operation.

7. The non-transitory computer readable medium of claim 1, wherein:

the gas is an inert gas;

the method includes:

purging the gaseous fuel circuit of the dual-fuel engine of the aircraft with the inert gas during shutdown of the dual-fuel engine of the aircraft; and once a flameout in a combustor of the dual-fuel engine of the aircraft has been detected, ceasing to purge the gaseous fuel circuit.

* * * * *